US009235880B2

(12) United States Patent
Kannermark et al.

(10) Patent No.: US 9,235,880 B2
(45) Date of Patent: Jan. 12, 2016

(54) CAMERA AND METHOD FOR OPTIMIZING THE EXPOSURE OF AN IMAGE FRAME IN A SEQUENCE OF IMAGE FRAMES CAPTURING A SCENE BASED ON LEVEL OF MOTION IN THE SCENE

(75) Inventors: Per Kannermark, Malmo (SE); Andreas Nilsson, Haljarp (SE)

(73) Assignee: AXIS AB, Lund (SE)

( * ) Notice: Subject to any disclaimer, the term of this patent is extended or adjusted under 35 U.S.C. 154(b) by 91 days.

(21) Appl. No.: 13/560,592

(22) Filed: Jul. 27, 2012

(65) Prior Publication Data

US 2013/0162855 A1    Jun. 27, 2013

Related U.S. Application Data

(60) Provisional application No. 61/580,372, filed on Dec. 27, 2011.

(30) Foreign Application Priority Data

Dec. 22, 2011    (EP) .................................... 11195213

(51) Int. Cl.
*H04N 5/225*    (2006.01)
*G06T 5/50*    (2006.01)
(Continued)

(52) U.S. Cl.
CPC . *G06T 5/50* (2013.01); *G06T 5/003* (2013.01); *H04N 5/2353* (2013.01);
(Continued)

(58) Field of Classification Search
CPC ............ H04N 5/2327; H04N 5/23277; H04N 5/23264

USPC ......................................... 348/208.99–208.11
See application file for complete search history.

(56) References Cited

U.S. PATENT DOCUMENTS 8,493,482 B2    7/2013 Cote et al.
2007/0035630 A1    2/2007 Lindenstruth et al.
(Continued)

FOREIGN PATENT DOCUMENTS

JP    2002199382 A    7/2002
JP    2010187250 A    8/2010
(Continued)

OTHER PUBLICATIONS

Jacobs, "Automatic High-Dynamic Range Image Generation for Dynamic Scenes," Computer Graphics and Applications, IEEE, 2008, pp. 84-94, vol. 28, No. 2.
(Continued)

*Primary Examiner* — Twyler Haskins
*Assistant Examiner* — Dwight C Tejano
(74) *Attorney, Agent, or Firm* — Volpe and Koenig, P.C.

(57) ABSTRACT

A method and camera are used for optimizing the exposure of an image frame in a sequence of image frames capturing a scene based on level of motion in the scene. Based on image data from a plurality of image sensor frames, regions of the scene are determined including different level of motion. Image frame regions for the image frame are determined, wherein an image frame region corresponds to at least one region of the scene. The exposure of the image frame is optimized by emulating a region specific exposure time for each image frame region by producing each image frame region using image data from a number of image sensor frames. The number of image sensor frames used to produce a specific image frame region is based on the level of motion in the at least one corresponding region of the scene.

21 Claims, 1 Drawing Sheet

(51) Int. Cl.
  *H04N 5/232* (2006.01)
  *H04N 5/235* (2006.01)
  *H04N 5/355* (2011.01)
  *G06T 5/00* (2006.01)
(52) U.S. Cl.
  CPC ........ *H04N 5/2355* (2013.01); *H04N 5/23254* (2013.01); *H04N 5/35572* (2013.01); *G06T 2207/10016* (2013.01); *G06T 2207/20021* (2013.01); *G06T 2207/20201* (2013.01); *G06T 2207/20216* (2013.01)

(56) References Cited

U.S. PATENT DOCUMENTS

| | | | |
|---|---|---|---|
| 2007/0120997 A1* | 5/2007 | Sasaki et al. | 348/362 |
| 2008/0043112 A1* | 2/2008 | Nikkanen et al. | 348/217.1 |
| 2008/0253758 A1 | 10/2008 | Yap et al. | |
| 2009/0115857 A1* | 5/2009 | Li et al. | 348/208.1 |
| 2009/0244301 A1 | 10/2009 | Border et al. | |
| 2009/0290028 A1* | 11/2009 | Yamasaki | 348/208.1 |
| 2010/0080477 A1 | 4/2010 | Almbladh | |
| 2010/0092151 A1 | 4/2010 | Miyakoshi | |
| 2011/0058050 A1* | 3/2011 | Lasang et al. | 348/208.4 |
| 2011/0149111 A1 | 6/2011 | Prentice et al. | |
| 2012/0026346 A1* | 2/2012 | Lee | 348/208.1 |

FOREIGN PATENT DOCUMENTS

| | | |
|---|---|---|
| TW | 200948050 A1 | 11/2009 |
| TW | 201225656 A1 | 6/2012 |
| WO | 2008099685 A | 8/2008 |
| WO | 2009/153836 A1 | 12/2009 |

OTHER PUBLICATIONS

Keith Wiley Astrophotography, "How Image Stacking Works" Printed from website address at: http://keithwiley.com/astroPhotography/imageStacking.shtml Nov. 23, 2011 (pp. 1-6).

* cited by examiner

CAMERA AND METHOD FOR OPTIMIZING THE EXPOSURE OF AN IMAGE FRAME IN A SEQUENCE OF IMAGE FRAMES CAPTURING A SCENE BASED ON LEVEL OF MOTION IN THE SCENE

CROSS REFERENCE TO RELATED APPLICATIONS

This application claims the benefit of European Patent Application No. EP 11195213.1 filed on Dec. 22, 2011 and U.S. Provisional Patent Application No. 61/580,372 filed on Dec. 27, 2011, which are incorporated by reference as if fully set forth.

FIELD OF INVENTION

The present invention relates to a method for optimizing the exposure of an image frame in a sequence of image frames capturing a scene based on level of motion in the scene. The present invention also relates to a computer-readable recording medium having recorded thereon a program for implementing the above method when executed on a device having processing capabilities. Further, the present invention also relates to a device having processing capabilities executing the computer-readable recording medium above. Furthermore, the present invention also relates to a camera arranged to optimize the exposure of an image frame in a sequence of image frames capturing a scene based on level of motion in the scene.

BACKGROUND

Cameras are commonly used in order to monitor buildings, roads, shops etc. Especially, cameras are used to monitor scenes in order to detect and/or track events in form of presence of motion.

Depending on the level of motion of the events monitored by the camera the exposure time of the image frames in a sequence of image frames in a video image stream capturing a scene monitored by the camera may be adjusted. For example according to PG Pub US2008/0043112, a long exposure time is used as long as there is no or a low level of motion in the captured scene. Whereas, when the monitored scene comprises events having a high level of motion a switch in exposure to a shorter exposure time occurs. However, a problem with this method is that when switching to the shorter exposure time the exposure time becomes too short for monitoring events having a low level of motion. It will be hard to distinguish details of the events having low level of motion, especially during dim light conditions, when the exposure time is too short. Moreover, if the detection of an event having a high level of motion fails, thus, if a long exposure time is used, the event will become blurry in the captured images.

A solution to the above is to use two or more cameras, the different cameras having different exposure time. However, such a known solution is costly and troublesome to use.

SUMMARY

A camera and method enable improvement in optimizing the exposure of an image frame in a sequence of image frames capturing a scene based on level of motion in the scene.

A camera and method enable an enhanced signal to noise ratio for events of low or no motion without blurring events of high motion.

A method is described for optimizing the exposure of an image frame in a sequence of image frames capturing a scene based on level of motion in the scene. A computer-readable recording medium having recorded thereon a program for implementing the method according to claim 1 when executed on a device having processing capabilities is described. A device having processing capabilities executing the computer-readable recording medium is described. A camera arranged to optimize the exposure of an image frame in a sequence of image frames capturing a scene based on level of motion in the scene is also described.

In particular, according to a first aspect of the invention a method for optimizing the exposure of an image frame in a sequence of image frames capturing a scene based on level of motion in the scene is provided. The method includes determining, based on image data from a plurality of image sensor frames, regions of the scene comprising different level of motion; determining image frame regions for the image frame, wherein an image frame region corresponds to at least one region of the scene; and optimizing the exposure of the image frame by emulating a region specific exposure time for each image frame region by producing each image frame region using image data from a number of image sensor frames, wherein the number of image sensor frames used to produce a specific image frame region is based on the level of motion in the at least one corresponding region of the scene.

According to this, based on the level of motion in a corresponding region of the scene, different exposure times for different image frame regions is emulated and thereby the exposure of the image frame is optimized. Due to this, regions of the scene having a low level of motion may be captured using a long emulated exposure time and regions of the scene having a high level of motion may be captured using a short exposure time. Hence, fast moving objects may be captured without being blurry at the same time as details of stationary or slow moving object may be enhanced. The regions of the image frame depicting the static regions of the scene or the regions of the scene with only small level of motion may have an enhanced signal to noise ratio. This is because these regions of the image frame are produced by using image data from a plurality of image sensor frames.

The image data used to produce each image frame region may be image data originating from the corresponding at least one region of the scene.

At least one image frame region may be produced by combining image data from two or more image sensor frames. The image data from two or more image sensor frames are used to produce the image frame region will exhibit enhance signal to noise ratio. Combining image data from two or more image sensor frames may be carried out through adding and/or averaging image data from two or more image sensor frames.

The level of motion in a region of the scene may correspond to the speed of events of motion in the region of the scene and/or to the number of events of motion in the region of the scene. The speed may be either the real speed of an event of motion in a region of the scene or the average speed of the events of motion in a region of the scene. That is, the speed (real or average) may be used to define presence of motion, the number of moving objects may be used to define the level of motion. Alternatively, the number of moving objects may define the presence of motion and the speed (average or real) may define the level of motion. The person skilled in the art realizes that many other alternatives to define the level of motion may as well be envisaged, but they all give some sort of measure indicating how much motion there is.

Each image sensor frame may be captured using a unit exposure time.

The region specific exposure time for each image frame region may be equal to or longer than the unit exposure time for each image sensor frame.

The plurality of image sensor frames may be used to construct a statistical map of level of motion for different regions of the scene, wherein the determining regions of the scene comprising different level of motion may be made by analyzing the statistical map. By using the statistical map the chance of missing a single event will decrease.

According to a second aspect, a computer-readable recording medium having recorded thereon a program for implementing the method above when executed on a device having processing capabilities is provided.

According to a third aspect, a device having processing capabilities executing the computer-readable recording medium above is provided.

According to a forth aspect, a camera arranged to optimize the exposure of an image frame in a sequence of image frames capturing a scene based on level of motion in the scene is provided. The camera includes an image sensor arranged to capture and output image data as image sensor frames; a motion detection module arranged to determine, based on image data from a plurality of image sensor frames, regions of the scene comprising different level of motion; an image frame production module arranged to produce the image frame, wherein the image frame production module is arranged to divide the image frame into image frame regions, wherein an image frame region corresponds to at least one region of the scene, wherein the image frame production module is arranged to produce each image frame region by using image data from a number of image sensor frames, wherein the number of image sensor frames used to produce a specific image frame region is based on the level of motion in the corresponding region of the scene, whereby the image frame production module is arranged to, based on the level of motion in a corresponding region of the scene, emulate different exposure times for different image frame regions and thereby the exposure of the image frame is optimized.

The image frame production module may be arranged to produce each image frame region by using image data originating from the corresponding at least one region of the scene.

The image frame production module may be arranged to produce at least one image frame region by combining image data from two or more image sensor frames, wherein the image frame production module may be arranged to combine image data from two or more image sensor frames by adding and/or averaging image data from two or more image sensor frames.

The motion detection module may be arranged to construct a statistical map of level of motion for different regions of the scene by using the plurality of image sensor frames, wherein the motion detection module may be arranged to determine the regions of the scene comprising different level of motion by analyzing the statistical map.

BRIEF DESCRIPTION OF THE DRAWINGS

This and other aspects of the present invention will now be described in more detail, with reference to appended drawings showing embodiments of the invention. The drawings should not be considered limiting the invention to the specific embodiment. Instead the drawings are used for explaining and understanding the invention.

DETAILED DESCRIPTION OF THE PREFERRED EMBODIMENTS

Figure 1:
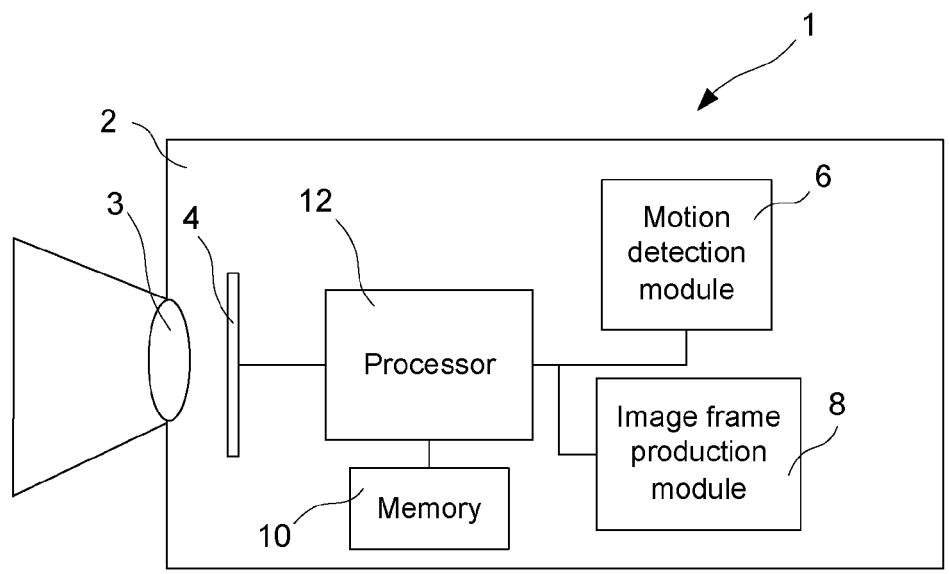
FIG. 1 is a schematic view of a digital network camera according to an embodiment.

FIG. 1 shows a schematic view of a camera 1 according to an embodiment. The camera 1 may be for example a digital network video camera. The camera may be used for example for monitoring purposes. Further, the camera 1 may be a stationary camera or a camera having pan/tilt functionality. In order to facilitate clarity in the description herein, some features of a camera are not described in full detail or may not be included or enumerated, as such description would not facilitate a better understanding of the embodiments to one skilled in the art. Moreover, the camera features presented herein should not be considered as limiting the scope. The camera 1 comprises a housing 2, a lens 3, an image sensor 4, motion detection module 6, an image frame production module 8, a memory 10 and a processor 12.

The image sensor 4 is arranged to capture image data representing a scene being viewed by the camera 1 and to output the image data as image sensor frames. The image sensor 4 may for example be a Charge Coupled Device (CCD), a CMOS-sensor or similar, for registering incident light. Alternatively, the image sensor 4 may be a sensor registering non visible light, such as a bolometer or an IR-detector.

Normally, each image sensor frame is having a unit exposure time. The unit exposure time may vary depending on the level of light in the scene and/or depending on the overal level of motion in the scene.

The motion detection module 6 is arranged to analyze the image data of the image sensor frames being outputted from the image sensor 4. Normally image data corresponding to a plurality of image sensor frames, constituting a video sequence, is analyzed in order to determine the presence of motion. Examples of methods of motion detection include analyzing spatial-temporal changes in an image volume of a video sequence. Such methods are well known for the person skilled in the art. An example of such methods is described in PG Pub US2010/0080477.

From the methods of motion detection, the events of motion as well as where in the scene they have occurred, it may be determined how many of these events there are and/or the speed of these events. The term "event of motion" should, in the context of the present application, be understood as presence of motion. Hence, the level of motion in different regions of the scene being viewed by the camera may be determined. The term "level of motion" in a region of the scene should, in the context of the present application, be understood as the speed of events of motion, i.e., moving objects, in the region of the scene and/or to the number of events of motion in the region of the scene. The speed may be either the real speed of an event of motion in a region of the scene or the average speed of the events of motion in a region of the scene. That is, the speed (real or average) may be used to define presence of motion and the number of moving objects may be used to define the level of motion. Alternatively, the number of moving objects may define the presence of motion and the speed (real or average) may define the level of motion. The person skilled in the art realizes that many other alternatives to define the level of motion may as well be envisaged but they all give some sort of measure indicating how much motion there is. The term "region of the scene" should, in context of the present application, be understood as a region of a scene of a camera being arranged to capture the plurality of images. The region may be represented as a coordinate within an image view of the camera, for instance using the pixel coordinate system but other representations may also be used. Depending on the size of each region of the scene and the extent of an event of motion within the scene, the event of motion may cover more than one region of the scene; hence in one embodiment a determined presence of an event of motion may result in a presence in more than one region of the scene. According to another embodiment, each region within a scene viewed by the camera is represented by a location, such as one or more pixels in the camera's current image view for example (i.e., represented by a pixel coordinate within one of the plurality of image sensor frames), together with a pan/tilt setting of the camera. This is applicable for a camera having pan/tilt functionality. Accordingly, a region within the scene being viewed by a pan/tilt camera may be determined.

The motion detection module 6 is arranged to determine, based on image data from a plurality of image sensor frames, regions of the scene, viewed by the camera, having different level of motion. In its simplest form, there may be two image sensor frames. For different regions of the scene depicted in these two image sensor frames the level of motion is then determined according to any one of the methods listed above, or any other suitable method for determining the level of motions in different regions of the scene by comparing image data between two image sensor frames. Some of the above methods and also other methods used for determining the level of motion in different regions of a scene may utilize more than two image sensor frames when determining the level of motion for the different regions. Thus, the motion detection module 6 is arranged to determine, based on image data from a plurality of image sensor frames, regions of the scene comprising different level of motion. Hence, the scene being viewed by the camera 1 is divided into a plurality of regions depending on the level of motion.

According to one embodiment, the motion detection module 6 is arranged to construct a statistical map of level of motion for different regions of the scene by using a plurality of image sensor frames. The map may be built up over time or constructed from historical data. The motion detection module 6 is further arranged to determine the regions of the scene comprising different level of motion by analyzing the statistical map. For this embodiment, the plurality of image sensor frames may consist of a large number of image sensor frames (e.g., where image sensor frames are being collected for minutes, hours or days). A normal frame rate to use is 60 frames per second. However, as well known by the person skilled in the art, other frame rates may also be used depending on application. This large number of image sensor frames is used to construct the map of level of motion in different regions of the scene viewed by the camera.

The statistical map of level of motion is built by analyzing the plurality of image sensor frames for events of motion. The data used to represent an event of motion may be output data from a motion detection algorithm within the motion detection module 6. Output data from the motion detection algorithm may comprise the speed of the event and in which region of the scene the event occurred. Each event of motion found when analyzing the plurality of image sensor frames may be registered in the statistical map. Thus, the statistical map may be built to include information representing the level of motion for different regions of the scene. Such a statistical map may be represented in a 3D histogram or frequency map. Hence, each bin, corresponding to a region of the scene in the 3D histogram or frequency map, may contain the level of motion being a value indicating how many times an event of motion has occurred at that specific location and/or what the speed for these events of motion is. The speed may be either the real speed of an event of motion in a region of the scene, or the average speed of the events of motion in a region of the scene. Alternatively, the statistical map may be represented as a mathematical expression, for instance a plane being a polynomial and where the level of motion in each region of the scene being the value of this polynomial in the specific location. Thus, the level of motion in each of the determined regions of the scene indicates regions where events of motion generally appear and also regions where events of motion generally do not appear. This will be further explained by the following example: a camera being used to monitor the entrance of a roadside store while still "seeing" some part of the pavement and the road in front of the store. In this scene, it can be expected that there will be much movement of cars on the road, somewhat less movement of people on the pavement and even less movement on the image parts that covers the wall(s) of the building. Thus, by using the above mentioned statistical map of level of motion for different regions of the scene, it can statistically be found that in the region corresponding to the road the level of motion is high, in the region corresponding to the pavement the level of motion is lower and in the region corresponding to the wall(s) of the building the level of motions is even lower.

The statistical map may be dynamically updated. That is, data relating to newly found events of motion from newly captured image sensor frames may be used to update the statistical map over time as more image data is captured. The updating may be triggered in various ways. According to one example, the updating is triggered when a certain amount of image data has been captured. According to another example, the updating is triggered by that a certain time period has lapsed since the last update. The update may be, for example, that data regarding events of motion originating from newly captured and analyzed image sensor frames are simply used to update the statistical map. According to another example, the updates may be made by deleting old events of motion. According to a further embodiment, data regarding events originating from newly captured and analyzed image sensor frames are used to update the statistical map and data corresponding to old events of motion are removed from the map.

The image frame production module 8 may be arranged to produce a sequence of image frames in a video image stream capturing the scene being viewed by the camera 1. Each image frame being produced by the image frame production module 8 may be divided into regions, wherein an image frame region corresponds to a region of the scene. The image frame production module 8 may be arranged to produce a region of an image frame in the sequence of image frames in a video image stream capturing the scene by using image data from one or more image sensor frames. The number of image sensor frames used to produce a specific region of the image frame is based on the level of motion in the corresponding region of the scene. Accordingly, based on the level of motion in a corresponding region of the scene, different exposure times for different regions of the image frame may be emulated. Thereby, the exposure of the image frame is optimized. Regions of the image frame having high level of motion is produced using image data from just one or a few first numbers of image sensor frames. Accordingly, a short exposure time is emulated for these regions. Whereas, regions of the image frame having low level of motion is produced using image data from a second number of image sensor frames. Accordingly, a long exposure time is emulated for these regions. The second number of image sensor frames being more than the first few number of image sensor frames. That is, the number of image sensor frames used to produce a specific image frame region is dependent upon the level of motion in the corresponding region of the scene. Thus, the exposure time for a first region of the image frame having a low level of motion is longer than a second exposure time for a second region of the image frame having a high level of motion.

The number of image sensor frames used to emulate the exposure time in a region of an image frame may be higher than the plurality of image sensor frames from the image sensor used to determine the regions of the scene comprising different level of motion. The vice-versa case is also possible, i.e., that the number of image sensor frames from the image sensor used to emulate the exposure time in a region of the image frame may be less (or of equal amount) than the plurality of image sensor frames used to determine the regions of the of the scene comprising different level of motion.

In case the number of image sensor frames used to produce a region of an image frame is two or more, the image frame production module 8 may be arranged to produce the region of the image frame by combining image data from the number of image sensor frames by adding image data from the number of image sensor frames. Alternatively, the image frame production module 8 may be arranged to produce the region of the image frame by combining image data from the number of image sensor frames by averaging image data from the number of image sensor frames. By emulating a longer exposure time by adding or averaging image data from a number of image sensor frames, (a so called "image stacking" which is widely used in the field of astrophotography), the signal-to-noise ratio may be increased.

It is realized that the motion detection module 6 and/or the image frame production module 8 may be implemented using hardware or software. If implemented in software, the software may be recorded on a computer-readable recording medium, e.g., the memory 10 of the camera 1, in order to be executed by the processor 10 of the camera 1.

Figure 2:
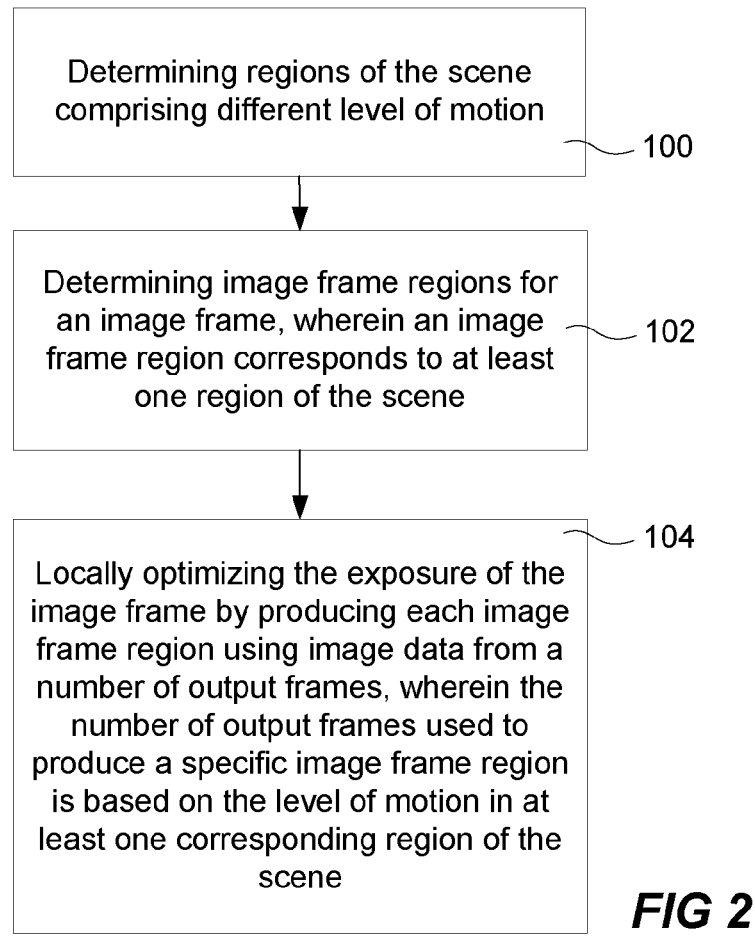
FIG. 2 is a schematic flow chart, showing a method according to an embodiment.

FIG. 2 illustrates a schematic flow chart according to an embodiment of a method for optimizing the exposure of an image frame in a sequence of image frames capturing a scene based on level of motion in the scene. The method includes the following steps. Based on image data from a plurality of image sensor frames, regions of the scene are determined 100 having different level of motion. Image frame regions for the image frame, are determined 102 wherein an image frame region corresponds to at least one region of the scene. The exposure of the image frame is optimized 104 by emulating a region specific exposure time for each image frame region by producing each image frame region using image data from a number of image sensor frames, wherein the number of image sensor frames used to produce a specific image frame region is based on the level of motion in the at least one corresponding region of the scene.

During step 100, the plurality of image sensor frames may be analyzed and events of motion may be detected. Events of motion are typically identified via a motion detection algorithm. The number of events of motion for each region of the scene and/or the speed for the events of motion for each region of the scene is determined in order to find the level of motion for each specific region of the scene.

Image data used to produce each image frame region is image data originating from the corresponding at least one region of the scene. When image data from two or more image sensor frames are used, the image data are combined through adding and/or averaging image data.

According to one embodiment, optimizing of the exposure of an image frame in a sequence of image frames capturing a scene based on level of motion in the scene, includes the following. Determining, based on image data from a plurality of image sensor frames, a first region of the scene having a first level of motion and a second region of the scene having a second level of motion. The exposure of the image frame is optimized by emulating a first exposure time for a first region of the image frame and a second exposure time for a second region of the image frame, wherein the first region of the image frame corresponds to the first region of the scene and wherein the second region of the image frame corresponds to the second region of the scene. The emulation of the exposure time is made by producing the first region of the image frame by using image data from a first number of image sensor frames, wherein the first number of image sensor frames used to produce the first region of the image frame is based on the level of motion in the first region of the scene. The second region of the image frame is produced by using image data from a second number of image sensor frames, wherein the second number of image sensor frames used to produce the second region of the image frame is based on the level of motion in the second region of the scene. The image data used to produce the first region of the image frame is image data originating from the first region of the scene and the image data used to produce the second region of the image frame is image data originating from the second region of the scene. The first level of motion is lower than the second level of motion and the first exposure time is longer than the second exposure time. The first number of image sensor frames used for producing the first region of the image frame is two or more and wherein the second number image sensor frames used for producing the second region of the image frame is one or more. The second emulated exposure time is equal to or longer than the exposure time for each individual image sensor frame in the plurality of image sensor frames. All image sensor frames have a unit exposure time. The level of motion in the first region and the level of motion in the second region may correspond to the real or average speed of events of motion in the corresponding region and/or to the number of events of motion in the corresponding region. When the number of image sensor frames used to produce a region of the image frame is two or more, producing the region of the image frame may be made by combining image data from the number of image sensor frames by adding image data from the number of image sensor frames and/or averaging image data from the number of image sensor frames.

In summation, according to an embodiment, at least two image sensor frames are compared in order to determine the level of motion in different regions of a scene being viewed or monitored by a camera. The exposure of image frames in a sequence of image frames in a video image stream capturing the scene are locally (in regions of the image frames) optimized based on the level of motion in the corresponding different regions of the scene. The optimization of the exposure of the image frames is made by emulating locally different exposure times for the different regions of the image frames. The exposure of an image frame of the sequence of image frames in a video image stream is optimized by locally emulating different exposure times for different regions of the image frame by producing the different regions of the image frame by using image data from different number of image sensor frames. The number of image sensor frames to be used for a specific region is based on the level of motion of the corresponding region of the scene. In case image data from two or more image sensor frames are used to produce a specific region of an image frame, the image data from the two or more image sensor frames are combined by adding and/or averaging. Hence, different exposure times for different image frame regions may be emulated based on the level of motion in a corresponding region of the scene and thereby the exposure of the image frame is optimized.

The person skilled in the art realizes that the present invention by no means is limited to the embodiments described above. For example the invention is applicable both for digital and analog cameras. In today's intelligent analog cameras, digital image processing is carried out within the camera and the digital signal is then converted to an analogue signal before leaving the camera. Also using an image A/D converter connected to an analogue camera, a simpler analog camera may be used.

Furthermore, the camera 1 may be connected to a network, be a standalone camera or be connected within a system in other ways.

Moreover, the plurality of images may be either still or moving images or a combination thereof.

Yet furthermore, the invention is not limited to being implemented in a camera; it may instead be implemented in a camera system comprising a camera and a processing unit. Thus, the camera is connected to the processing unit, e.g. via a network. According to this embodiment, the camera is arranged to capture and produce the image sensor frames and the processing unit is arranged to process the image data. Hence, the processing unit comprises the motion detection module 6, the image frame production module 8, the memory 10 and the processor 12. A plurality of cameras may be connected to the processing unit, wherein the processing unit is arranged to process the images captured by each one of the plurality of cameras.

Thus, many modifications and variations are possible within the scope of the appended claims.

The invention claimed is:

1. A method for producing an image frame in a sequence of image frames capturing a scene based on level of motion in the scene, the image frame in a sequence of image frames having an optimized exposure, the method comprising:
   accessing image sensor frames representing the scene;
   detecting motion in image data from a plurality of the image sensor frames;
   determining regions of the scene comprising different levels of motion based on the motion detected in image data from the plurality of the image sensor frames;
   determining image frame regions for the image frame, wherein an image frame region corresponds to at least one of the regions of the scene;
   optimizing the exposure of the image frame by emulating a region specific exposure time for each image frame region by producing different image frame regions using image data from different numbers of the image sensor frames, wherein a number of the image sensor frames used to produce a specific image frame region is based on the level of motion in the at least one corresponding region of the scene.

2. The method according to claim 1, wherein the image data used to produce each image frame region is image data originating from the corresponding at least one region of the scene.

3. The method according to claim 1, wherein at least one image frame region is produced by combining image data from two or more image sensor frames.

4. The method according claim 3, wherein combining image data from two or more image sensor frames is carried out through adding and/or averaging image data from two or more image sensor frames.

5. The method according to claim 1, wherein the level of motion in a region of the scene corresponds to the speed of events of motion in the region of the scene and/or to the number of events of motion in the region of the scene.

6. The method according to claim 1, wherein each image sensor frame is captured using a unit exposure time.

7. The method according to claim 1, wherein the region specific exposure time for each image frame region is equal to or longer than the unit exposure time for each image sensor frame.

8. The method according to claim 1, wherein the plurality of image sensor frames are used to construct a statistical map of level of motion for different regions of the scene, wherein the determining regions of the scene comprising different level of motion is made by analyzing the statistical map.

9. A non-transitory computer-readable recording medium having recorded thereon a program for implementing the method that when executed on a device having processing capabilities, performs the following steps:
   accessing image sensor frames representing the scene;
   detecting motion in image data from a plurality of the image sensor frames;
   determining regions of the scene comprising different levels of motion based on the motion detected in image data from the plurality of the image sensor frames;
   determining image frame regions for the image frame, wherein an image frame region corresponds to at least one of the regions of the scene;
   optimizing the exposure of the image frame by emulating a region specific exposure time for each image frame region by producing different image frame regions using image data from different numbers of the image sensor frames, wherein a number of the image sensor frames used to produce a specific image frame region is based on the level of motion in the at least one corresponding region of the scene.

10. A device having processing capabilities executing the computer-readable recording medium according to claim 9.

11. A camera arranged to produce an image frame in a sequence of image frames capturing a scene based on level of motion in the scene, the image frame in a sequence of image frames having an optimized exposure, the camera comprising:
   an image sensor arranged to capture and output image data as image sensor frames;
   an image frame production module arranged to produce the image frame;
   wherein the image frame production module is arranged to divide the image frame into image frame regions, and
   wherein the image frame production module is arranged to produce each image frame region by using image data from a number of the image sensor frames; and
   a motion detection module arranged to detect motion in image data from a plurality of the image sensor frames, and to determine regions of the scene comprising different levels of motion based on the motion detected in image data from the plurality of the image sensor frames, wherein an image frame region corresponds to at least one of the regions of the scene, and
   wherein a number of image sensor frames used to produce a specific image frame region is based on the level of motion in the at least one corresponding region of the scene,
   whereby the image frame production module is arranged to emulate, based on the level of motion in at least one corresponding region of the scene, different exposure times for different image frame regions and thereby the exposure of the image frame is optimized.

12. The camera according to claim 11, wherein the image frame production module is arranged to produce each image frame region by using image data originating from the corresponding at least one region of the scene.

13. The camera according to claim 11, wherein the image frame production module is arranged to produce at least one image frame region by combining image data from two or more image sensor frames, wherein the image frame production module is arranged to combine image data from two or more image sensor frames by adding and/or averaging image data from two or more image sensor frames.

14. The camera according to claim 11, wherein the level of motion in a region of the scene corresponds to the speed of events of motion in the region of the scene and/or to the number of events of motion in the region of the scene.

15. The camera according to claim 11, wherein the motion detection module is arranged to construct a statistical map of level of motion for different regions of the scene by using the plurality of image sensor frames, wherein the motion detection module is arranged to determine the regions of the scene comprising different level of motion by analyzing the statistical map.

16. The method according to claim 8, wherein the statistical map indicates frequency of motion events occurring at specific location.

17. The method according to claim 8, wherein the statistical map is updated over time based on data relating to the motion events acquired from the image sensor frames.

18. The camera according to claim 15, wherein the statistical map indicates frequency of motion events occurring at specific location.

19. The camera according to claim 15, wherein the statistical map is updated over time based on data relating to the motion events acquired from the image sensor frames.

20. The method according to claim 1, wherein the level of motion in a region of the scene corresponds to the speed of events of motion in the region of the scene and to the number of events of motion in the region of the scene.

21. The method according to claim 11, wherein the level of motion in a region of the scene corresponds to the speed of events of motion in the region of the scene and to the number of events of motion in the region of the scene.

* * * * *